United States Patent
Vossen et al.

(10) Patent No.: US 6,818,737 B2
(45) Date of Patent: Nov. 16, 2004

(54) METHOD OF PRODUCING ARTICLES FROM SYNDIOTACTIC VINYL AROMATIC POLYMERS

(75) Inventors: Roel Vossen, Hulst (NL); Rudi Veraart, Aardenburg (NL); Peter Jackson, Hulst (NL); Juergen Schellenberg, Halle (DE); Clement Hiel, Rancho Palos Verdes, CA (US)

(73) Assignees: Dow Global Technologies Inc., Midland, MI (US); Clean Baking Products BVBA, Melsele (BE)

( * ) Notice: Subject to any disclaimer, the term of this patent is extended or adjusted under 35 U.S.C. 154(b) by 0 days.

(21) Appl. No.: 10/784,519

(22) Filed: Feb. 23, 2004

(65) Prior Publication Data

US 2004/0171792 A1 Sep. 2, 2004

Related U.S. Application Data

(60) Provisional application No. 60/450,749, filed on Feb. 28, 2003.

(51) Int. Cl.[7] .................................................. C08F 6/00
(52) U.S. Cl. .................... 528/481; 528/502 R; 528/503; 264/347
(58) Field of Search ........................... 528/481, 520 R, 528/503; 264/347

(56) References Cited

U.S. PATENT DOCUMENTS

| | | | | |
|---|---|---|---|---|
| 4,680,353 A | | 7/1987 | Ishihara et al. | 526/160 |
| 5,066,741 A | | 11/1991 | Campbell, Jr. | 526/171 |
| 5,145,950 A | * | 9/1992 | Funaki et al. | 528/481 |
| 5,206,197 A | | 4/1993 | Campbell, Jr. | 502/103 |
| 5,270,442 A | | 12/1993 | Nakano | 528/481 |
| 5,294,685 A | | 3/1994 | Watanabe et al. | 526/134 |
| 5,877,271 A | | 3/1999 | Billovits et al. | 528/503 |
| 6,031,070 A | * | 2/2000 | Billovits et al. | 528/491 |

FOREIGN PATENT DOCUMENTS

EP 325125 3/1996 ............ B29C/71/02

\* cited by examiner

*Primary Examiner*—Fred Teskin

(57) ABSTRACT

The present invention relates to a process of producing a molded article from a composition comprising a syndiotactic vinyl aromatic polymer, wherein the molded article has a residual vinyl aromatic monomer content of less than 0.05 per 100 parts syndiotactic vinyl aromatic polymer comprising molding a composition of a syndiotactic vinyl aromatic polymer having a residual vinyl aromatic monomer content of less than 0.3 parts per 100 parts syndiotactic vinyl aromatic polymer, at a temperature of from 265° C. to 305° C. to produce a molded article; and heat treating the molded article at a temperature of 210° C. to 230° C. for at least 2 minutes to thermally initiate free radical polymerization of the residual monomer.

5 Claims, No Drawings

METHOD OF PRODUCING ARTICLES FROM SYNDIOTACTIC VINYL AROMATIC POLYMERS

CROSS-REFERENCE STATEMENT

This application claims the benefit of U.S. Provisional Application No. 60/450,749 filed Feb. 28, 2003.

BACKGROUND OF THE INVENTION

The process of the present invention relates to methods of producing articles from compositions of syndiotactic vinyl aromatic polymers, particularly articles for use in food applications.

Food applications typically require a very low level of residual monomer contaminants within the polymers and articles produced therefrom. Many methods have been set forth to reduce levels of residual vinyl aromatic monomer in vinyl aromatic polymers and syndiotactic vinyl aromatic polymers. U.S. Pat. No. 5,877,271 discloses a drying process utilizing heat treatment of syndiotactic polystyrene (SPS) pellets to avoid free-radical polymerization of styrene, allowing a faster evaporation of styrene and reducing the residence time of the polymer at higher temperatures by very rapid heating.

EP 325,125 and U.S. Pat. No. 5,270,442 disclose a method of producing syndiotactic polystyrene moldings having crystallinity of at least 20% comprising subjection the moldings to heat treatment at a temperature of 120 to 270° C. in order for such crystallinity to be obtained. These crystalline polymers are extracted as shown in the examples, to remove unwanted atactic polystyrene as well as styrene monomer prior to molding and heat treatment. However, the extraction is an added step which adds time and cost to the process of producing such articles.

Therefore, there remains a need for an efficient and cost effective process of producing molded articles of syndiotactic vinyl aromatic polymers, particularly for articles which will be utilized in food applications, such that the level of residual monomer in the articles is less than 0.05 parts per hundred parts of syndiotactic vinyl aromatic polymer.

SUMMARY OF THE INVENTION

The present invention is a process of producing a molded article from a composition comprising a syndiotactic vinyl aromatic polymer, comprising:

I) molding the composition comprising a syndiotactic vinyl aromatic polymer, herein the syndiotactic vinyl aromatic polymer has a residual vinyl aromatic monomer content of less than 0.3 parts per 100 parts syndiotactic vinyl aromatic polymer, at a temperature of from 265° C. to 305° C. to produce a molded article; and II) heat treating the molded article at a temperature of 210° C. to 230° C. for at least 2 minutes to thermally initiate free radical polymerization of the residual monomer such that the molded article has a residual vinyl aromatic monomer content of less than 0.05 per 100 parts syndiotactic vinyl aromatic polymer.

This process produces articles acceptable for food applications by utilizing a polymer having low residual monomer in the molding step and further heat treating the formed article to polymerize unreacted residual monomer within the molded article. Food application examples include food packaging and food handling equipment as well as direct contact applications such as baking trays and food storage and/or reheating containers.

DETAILED DESCRIPTION OF THE INVENTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein is hereby incorporated by reference in its entirety, especially with respect to the disclosure of analytical or synthetic techniques and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", as used herein, includes both homopolymers, that is, polymers prepared from a single reactive compound, and copolymers, that is, polymers prepared by reaction of at least two polymer forming reactive, monomeric compounds. The term "crystalline" refers to a polymer that exhibits an X-ray diffraction pattern at 25° C. and possesses a first order transition or crystalline melting point (Tm). The term may be used interchangeably with the term "semicrystalline". The term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

Syndiotactic vinyl aromatic polymers are homopolymers and copolymers of vinyl aromatic monomers, that is, monomers whose chemical structure possess both an unsaturated moiety and an aromatic moiety. The preferred vinyl aromatic monomers have the formula:

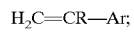

$H_2C=CR—Ar$;

wherein R is hydrogen or an alkyl group having from 1 to 4 carbon atoms, and Ar is an aromatic radical of from 6 to 10 carbon atoms, including alkyl or halo ring substituted aromatic radicals. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene, chlorostyrene, bromostyrene, and the like. Syndiotactic polystyrene is the currently preferred syndiotactic vinyl aromatic polymer. Typical polymerization processes and coordination catalyst systems for producing syndiotactic vinyl aromatic polymers are well known in the art and are described in U.S. Pat. Nos. 4,680,353, 5,066,741, 5,206,197 and 5,294,685, and elsewhere.

During polymerization of the vinyl aromatic monomer, the polymerization reaction is not typically carried to completion and a mixture of syndiotactic vinyl aromatic polymer and volatiles, such as residual monomers and process solvents, is produced. This mixture typically contains from about 2 to about 99 percent solid, non-volatile, high molecular weight polymer, preferably from about 30 to about 95 percent, more preferably from about 40 to about 95 percent, and most preferably from about 70 to about 90 percent by weight based on the total weight of the mixture. The bulk density of the feed is typically less than 400 kg/m$^3$, preferably less than 350 kg/m$^3$. The average particle size ($dp_{50}$) is generally less than 500 $\mu$m, preferably less than 400 $\mu$m. The polymer can then be recovered from this mixture using a finishing process such as devolatilization to produce resins which are useful for forming injection molded articles, films, fibers, etc.

In the production of syndiotactic vinyl aromatic polymers such as syndiotactic polystyrene (SPS), a devolatilization step is typically used to remove residual monomers, process solvents, and other volatile components from the SPS polymer. The feed mixture is typically discharged from a polymerization reactor or polymer recovery system at a temperature below 100° C., typically from about 10 to about 90° C. This mixture is then devolatilized in the presence of steam and optionally one or more other catalyst deactivating agents at a temperature between the glass transition temperature (typically around 100° C.) and the melting point of the devolatilized syndiotactic vinyl aromatic polymer (typically from 200 to 320° C.). To reduce the time necessary to achieve the desired level of volatiles removal, the feed mixture may be heated to a temperature of at least 110° C., more preferably to at least 125° C. prior to or simultaneously with contacting with steam. In one embodiment, the steam itself is used as the heating medium to attain the foregoing temperature limits.

Any means of heating the feed mixture can be used in the process of producing the syndiotactic vinyl aromatic polymer. Examples of such heating means include but are not limited to indirect dryers, where the feed material is in contact with a metal surface heated by an appropriate heat transfer fluid, for example, disc, drum, low and high speed paddle-type, rotary, and screw conveyor dryers; kinetic energy heaters using a plow-type mixer/dryer augmented by high speed choppers, pneumatically conveyed hammer mills or batchwise operated mixer/homogenizers utilizing high speed agitators; direct dryers, which utilize a hot gas stream for heating, for example, flash dryers; all types of fluid bed dryers, conveyor-type, tray, and direct heated rotary dryers; conventional dryer/heater devices augmented with auxiliary heating technology, such as radiant infrared, microwave heating or similar technology, and combinations thereof. Additional suitable equipment includes insulated, gas purged, mass flow hoppers, and storage silos.

The first stage of the devolatilization process is performed in the presence of steam which deactivates residues of the active catalyst contained within the feed mixture thereby rendering it inactive for further polymerization reactions and assists in removal of residual volatile components (purging). Preferably the steam is generated in a separate process and heated to a temperature above the boiling point of water at the pressure of the devolatilization (superheated steam). Alternatively, liquid water can be injected directly into the devolatilization apparatus or admixed with the incoming feed mixture, and thereby vaporized by heating the entire mixture. The configuration of the feed mixture entrance, purge gas (steam) entrance, and liquid injection ports should be arranged in the devolatilization apparatus so as to maximize the contact time between the feed mixture and the steam. It is desirable that the steam rapidly diffuse into the polymer mass and react with active residual catalyst components, thereby deactivating them, such that prolonged exposure to elevated temperatures and polymer discoloration or degradation is avoided.

Highly desirably, the steam is contacted with the feed mixture in a first devolatilizer wherein the steam is injected in a counter-current flow with respect to the flow of feed, at a temperature from 130 to 210° C., preferably from 150 to 210° C., in a quantity so as to provide a steam:volatiles mass ratio from 0.5 to 10, preferably from 1 to 5.

In addition to steam, other catalyst deactivating agents may be utilized in step a) as well. Typically, the vaporized form of any active nucleophilic compound which is capable of deactivating residual active catalyst components may be used in addition to steam. Such compounds include a wide variety of polar organic and inorganic compounds, such as those represented by the general chemical formula: $C_iH_jO_k$-$S_lN_mX_n$ (II), wherein X is fluorine, chlorine, bromine or iodine, i is an integer from 0 to 6, j is an integer from 0 to 14, k is an integer from 0 to 3, l and m are integers from 0 to 2, and n is an integer from 0 to 6, such that all appropriate valencies are fulfilled.

Typically, a suitable catalyst deactivating agent, if employed, is characterized by a molecular weight below around 100 Dalton, limited solubility in the polymer produced, and compatibility with steam or water vapor. This prevents the need for removal in a subsequent step and degradation by reaction with the steam employed in the deactivation and devolatilization process. In order to facilitate reuse of monomers and other volatile components recovered from the devolatilization process and to prevent potential polymer discoloration, it is preferable that any secondary catalyst deactivating agent also be unreactive with the vinyl aromatic monomers and process solvents at the conditions employed in the devolatilization process. Typical secondary deactivation agents employed include carbon dioxide, carbon monoxide, hydrogen sulfide, sulfur dioxide, ammonia, polar organic compounds such as alcohols, aldehydes, ketones and the like, and combinations thereof.

The quantity of steam or mixture thereof with other catalyst deactivating agent(s) necessary to achieve the desired deactivation is dependent upon the residual level of all active catalyst components in the feed mixture, however, considerable excess is typically used to ensure complete deactivation. The mass flow rate of steam/catalyst deactivating gas mixture used is typically in the range of 0.1 to 80 percent of the feed mixture flow rate. Highly desirably, the steam or steam mixture is passed through the apparatus in a countercurrent manner with respect to the feed mixture. Steam temperatures from 150 to 270° C., preferably from ISO to 210° C. are desirably employed.

Other inert gases, which have no effect upon active catalyst residues or evolved volatile components and which are not appreciably absorbed into the polymer, may also be present in addition to steam or the mixture of steam and other catalyst deactivating compound. Typical inert gases include nitrogen, noble gases such as argon and helium, alkanes such as methane and ethane, hydrogen, and combinations thereof. These components act as diluents and can assist in conveying volatiles out of the devolatilization apparatus and reducing the residual volatiles content in the dried product. In order to best achieve the desired level of deactivation, the molar ratio of inert gases to steam or mixture of steam and other catalyst deactivating compound should typically not exceed 99/1.

The first stage of the devolatilization process can be performed at a variety of operating pressures within the devolatilization apparatus, provided that the steam is maintained in the vapor state at the temperature and pressure employed in the devolatilization process. The devolatilization process can be carried out at or near atmospheric pressure or, with appropriate design of the devolatilization apparatus, at elevated or reduced pressures. Operation at sub-atmospheric pressures is possible by application of vacuum to evacuate evolved volatiles and excess steam or other deactivation agent from the devolatilization apparatus. Highly desirably the first devolatilization step is conducted at or near-atmospheric pressure using super heated steam, especially steam at from 130 to 210° C.

As a result of heating the feed mixture, volatile components including residual vinyl aromatic monomers, are released from the polymer, vaporized, and conveyed out of the apparatus along with a flowing discharge stream. The residence time of the polymer in the devolatilization apparatus should be sufficient to reduce the residual vinyl aromatic monomer content in the devolatilized polymer from the initial value in the feed mixture, typically 5 to 60 percent, to less than 3 percent, preferably less than 1 percent based on the weight of the devolatilized polymer. The resultant polymer preferably has a content of residual monomer of less than 0.3, preferably less than 0.25, more preferably less than 0.20 and most preferably less than 0.15 parts per 100 parts of syndiotactic vinyl aromatic polymer. The residence time needed in the devolatilization apparatus to achieve such a reduced volatiles level is dependent upon the original volatiles content of the feed mixture, the temperature in the devolatilization apparatus, the total flow rate of catalyst deactivating and inert gases, the absolute pressure in the devolatilization apparatus, and the physical characteristics of the feed mixture. Generally, the devolatilization is conducted under conditions such that the residence time needed to achieve the residual vinyl aromatic monomer content recited above is 24 hours or less, typically 12 hours or less, preferably 4 hours or less, more preferably 1 hour or less and most preferably 30 minutes or less.

Desirably, the feed mixture is rapidly heated to a temperature between about 110° C. and the melting temperature of the syndiotactic vinyl aromatic polymer. Preferably, the mixture is heated to a temperature which is approximately 20° C. to 100° C. below the melting point of the fully dried polymer. Rapid heating can generally be performed in an apparatus capable of increasing the temperature of the feed mixture at an average rate of at least 10° C./minute, typically at least 10 to 1000° C./minute, preferably at least 20° C./minute, more preferably at least 30° C./minute, and most preferably at least 40° C./minute. By beating at a faster rate, the residual monomer is more likely to volatilize rather than polymerize, thereby resulting in production of reduced quantities of atactic vinyl aromatic polymer within the syndiotactic vinyl aromatic polymer.

Following step a), the polymer product is further devolatilized by contacting a second time with counter current flow of a devolatilizing agent in a second devolatilization device such as those previously disclosed with respect to step a). Suitable devolatilizing agents include steam, the secondary devolatilizing agents and inert gases previously described for use in step a), and mixtures thereof. An especially desired devolatilizing agent used in step b) is steam or a mixture of steam and a secondary devolatilizing agent. Preferred examples of suitable devolatilizing devices for use in step b) include direct and indirect heated dryers. Most desirably the apparatus for step b) is a high temperature, rotary dryer equipped with counterflow injection of devolatilizing agent and gas removal port. In the second contacting step, the devolatilizing agent employed is desirably at the same or at a higher temperature than the steam or steam mixture used in the first devolatilizing step. Desirable temperatures for the devolatilization agent in step b) are from 150 to 270° C., preferably from 170 to 230° C.

In order to obtain reduced discoloration in the polymer produced, it is important that the feed stream is not contacted with air or oxygen until at least step a) and preferably both step a) and step b) are completed. Therefore, it is important that the feed stream and the polymer produced remain in contact with a catalyst deactivating gas or an inert gas as defined above until the desired volatiles level is achieved. In addition, the steam or steam mixture should be filtered prior to injection into the devolatilization apparatus to remove contaminants and particles that may cause color body formation.

The final stage of polymer devolatilization is a melting, extruding and pelletizing step, desirably utilizing a vented extruder or an extruder operating under reduced pressure. Examples of such melt extrusion devices employed in step c) include vented or vacuum equipped single and twin screw extruders, equipped with water bath or similar coolers and choppers or similar pelletizing apparatus. Filtration of the molten devolatilized product may be employed if desired as well. These units can also be used in producing formulated products by mixing additives such as antioxidants, processing aids, impact modifiers, flame retardants, fillers, for example, fiberglass, minerals, or other polymeric materials with the polymer produced to form blends or alloys as well. By incorporating a pelletizer, such as a water bath cooler and chopper, the resulting devolatilized extrudate can he formed into uniformly shaped pellets in a highly efficient manufacturing process. Highly desirably the extruded product attains a sufficient degree of crystallization prior to cooling and pelletizing to form opaque, solid pellets that resist blocking and agglomeration.

Desirably, the feed mixture is retained at an elevated temperature between step a) and step b) as well as between step b) and step c). Typical product temperatures are from 120 to 200° C. between steps a) and b) and from 140 to 200° C. between steps b) and c). Preferably the melting and extrusion step is conducted directly following steps a) and b) in a continuous manner. The melt extrusion step is conducted at increasing temperatures up to the melting point of the polymer and preferably at least 10° C. greater than the polymer's crystalline melting point. Maximum extrusion temperatures of the polymer melt are desirably less than 50° C. greater than the crystalline melting point of the polymer. For syndiotactic polystyrene the final stage of the melt extruder is desirably from 240 to 320° C. A vacuum is preferably employed during the melting and extrusion to further reduce volatile components of the melt. Generally, pressures from 1000 to 5000 Pa, preferably from 1000 to 1500 Pa are employed during the extrusion.

For crystallized, opaque pellets produced, the reduced discoloration of the syndiotactic vinyl aromatic polymer can be measure according to ASTM E313 which measures a Yellowness Index or YIE. Typically, the polymer containing low residual monomers produced obtains a YIE of less than 10. Alternatively, ASTM D1925 which compares the Yellowness Index of nearly transparent extruded films of equal thickness using a light transmission technique can be used.

Residual vinyl aromatic monomer content can be determined using headspace gas chromatography with an appropriate solvent, for example, orthodichlorobenzene, by reference to samples of known composition. Atactic polymer content can be determined by Soxhlet extraction using methyl ethyl ketone, which is a solvent for atactic vinyl aromatic polymers, and a non-solvent for crystalline, syndiotactic vinyl aromatic homopolymers and copolymers.

Typically, the syndiotactic vinyl aromatic polymers utilized have a weight average molecular weight (Mw) of at least 15,000, preferably at least 50,000, and most preferably from 150,000 to 500,000. The polymer crystalline melting point, Tm, is desirably greater than 240° C., preferably greater than 245° C. Additionally, the polymer prior to devolatilization desirably has a bulk density of at least 175 $kg/m^3$, preferably at least 200 $kg/m^3$ up to 400 $kg/m^3$, preferably less than 350 $kg/m^3$; and an average particle size, $dp_{50}$, of at least 75 $\mu$m, preferably at least 100 $\mu$m, up to 450 $\mu$m preferably up to 400 $\mu$m.

Although the residual monomer content can be further reduced by other methods such as Soxhlet extraction, it is preferred that the syndiotactic vinyl aromatic polymer utilized in the molding step of the present invention is not a syndiotactic vinyl aromatic polymer which has undergone additional treatment to remove residual monomer after devolatilization and prior to molding.

The composition for molding may also contain other materials such as heat stabilizers, nucleators, lubricants, impact modifiers, mineral fillers or glass fillers, compatibilizers and the like.

In one embodiment, the syndiotactic vinyl aromatic polymer composition additionally comprises glass filler and is used to produce an article useful in food contact applications, e.g. baking trays.

In one embodiment the composition for molding comprises:
- 22 to 100, preferably 55 to 99 weight percent syndiotactic styrene homopolymer having less than 500 ppm residual monomer content,
- 0 to 1 weight percent heat stabilizer, such as tetrakis (methylene(3,5-di-tert-butyl-4-hydroxyhydrocinnamate))methane,
- 0 to 2 weight percent crystallization nucleator, such as methylenebis-(4,6-di-tert-butylphenyl)phosphate sodium salt,
- 0 to 5 weight percent lubricant, such as montan ester wax mixture OP,
- 0 to 20 weight percent impact modifier, such as styrene-ethylene-butylene-styrene hydrogenated triblock elastomer Kraton™ G1651,
- 0 to 45 weight percent glass filler, such as chopped strand fiberglass OCF 123D-10C (available from Owens Corning), and
- 0 to 10 weight percent compatibilizer, such as fumaric acid-grafted polyphenyleneoxide homopolymer;

wherein all weight percents are based on the total weight of the composition.

An article is molded from the composition comprising the syndiotactic vinyl aromatic polymer utilizing injection molding or extrusion molding techniques which are well known in the art. The molding is advantageously conducted at a temperature of from 265° C., preferably from 270° C. to 305° C., preferably to 300° C., wherein the residence time at that temperature is typically less than 10 minutes, preferably less than 9 minutes and more preferably less than 8 minutes.

The molded article is then removed from the mold and heat treated. The heat treatment is typically conducted at a temperature of from 210, more preferably from 215 to 230, preferably to 225° C. for at least two minutes and less than 2 hours. The residence time of the heat treatment will depend upon the part thickness and the temperature of the heat treatment. The heat treatment is conducted until the level of residual monomer in the molded part is less than 500 parts per million, preferably less than 400 parts per million, more preferably less than 350 parts per million and most preferably less than 300 parts per million, based on the total weight of syndiotactic vinyl aromatic polymer. Typically, for example, a 2 mm thick part will be treated for 10 minutes at 220° C. immediately after molding. In general, the residence time changes in proportion to the square of the thickness of the part at a given temperature. For example, if the thickness of the part (d, in mm) is 4 mm, then the part is typically heat-treated for a residence time (t, in min) of 40 min. at the same temperature of 220° C. One could use the formula:

$$t=R \times d^2$$

wherein R=2.5 (min/mm$^2$).

Preferably the molded article is heat treated immediately after the molding process has been completed in order to prevent heat loss, although heat treatment after the article has cooled can still be beneficial in obtaining the low residual monomer content as desired by the process of the present invention.

The heat treatment can occur in any device which will insure good hot air flow and high heat transmissions. Any means of heating can be used and include, but are not limited to, indirect dryers, direct dryers which utilize a hot gas stream for heating, for example, flash dryers; all types of fluid bed dryers, conveyor-type, tray, conventional dryer/heater devices augmented with auxiliary heating technology, such as radiant infrared, microwave heating or similar technology, and combinations thereof. Typically, a well ventilated oven is used.

The following examples are provided to illustrate the present invention. The examples are not intended to limit the scope of the present invention and they should not be so interpreted. Amounts are in weight parts or weight percentages unless otherwise indicated.

EXAMPLES

A. Production of SPS Having low Residual Monomer Content

A feed of syndiotactic polystyrene homopolymer containing 20 percent volatile components, less than 1 percent atactic polymer, and active metallocene catalyst residues is fed from a polymerization reactor system inertly, without contacting air, at a rate of 1800 kg/hr to a finishing process consisting of two heated, rotary dryers equipped with countercurrent steam injection ports followed by an extruder. The first dryer is a model SJS 48–30 dryer and the second is a model CRJS 60–23 dryer, both made by Hosokawa Bepex Corp. The extruder is a Berstorff ZE 130A twin screw extruder, with L/D=25, equipped with one vacuum (1500 Pa) vent. The first dryer is operated with a feed zone jacket temperature of 185° C., a discharge zone jacket temperature of 210° C., and a rotor speed of 100 rpm. Steam at approximately atmospheric pressure is filtered to remove contaminants, preheated to 210° C., and fed to the first dryer counter-currently to the solids flow at a rate of 800 kg/hr, giving a steam/volatiles mass ratio of 2.22:1. The powder product discharge temperature is 196° C.

The second dryer is supplied with steam similarly preheated to 210° C. at a feed rate of 310 kg/hr, giving a steam/polymer mass ratio of 0.251. The secondary dryer is operated with a uniform jacket temperature of 210° C.

Powder leaving the dryer has a temperature of 143° C. and is charged directly to the feed port of the extruder. The extruder barrel set point temperatures ranged from 150 to 275° C. and the extruder screw speed is 150 rpm. The devolatilized extrudate is formed into strands, cooled in a water bath, and cut into pellets.

The residual styrene content of the resulting polymer pellets is 350 ppm as measured by headspace gas chromatography. The content of atactic polystyrene in the polymer is 0.52 percent. Residual organic decomposition products of the polymerization catalyst are less than 12 ppb, the limit of detection by gas chromatograph-mass spectroscopy (GC-MS).

B. Molding of SPS Having Low Residual Monomer Content

A syndiotactic polystyrene molding compound consisting of

- 71.30 weight percent of syndiotactic styrene homopolymer having 350 ppm monomer content produced by process A,
- 0.75 weight percent of the heat stabilizer tetrakis (methylene(3,5-di-tert-butyl-4-hydroxyhydrocinnamate))methane,
- 0.45 weight percent of the crystallization nucleator methylenebis-(4,6-di-tertbutylphenyl)phosphate sodium salt,
- 0.5 weight percent of the lubricant montan ester wax mixture OP,
- 5.0 weight percent of the impact modifier styrene-ethylene-butylene-styrene hydrogenated triblock elastomer Kraton™ G1651,
- 20.0 weight percent of the chopped strand fiberglass OCF 123D-10C (available from Owens Corning), and
- 2.0 weight percent of a fumaric acid-grafted polyphenyleneoxide homopolymer compatibilizer, is molded in a molding machine with a feed throat temperature of 50° C., and a mold temperature of 280° C. and of 300° C., for a residence time of 5 minutes. The temperature of the mold is then adjusted to 70° C. and the article removed from the mold. After cooling of the molded parts to room temperature, the residual monomer content of the parts are measured at 340 ppm for the part molded at 280° C.; and 393 ppm for the part molded at 300° C.

(Comparative Molding)

The syndiotactic polystyrene molding composition of B is molded in a molding machine with a feed throat temperature of 50° C., a mold temperature of 320° C., for a residence time of 5 minutes. The temperature of the mold is then adjusted to 70° C. and the article removed from the mold. After cooling of the molded parts to room temperature, the residual monomer content of the parts are determined to be 670 ppm.

C. Heat Treatment

A 2 mm plaque of the molded parts manufactured according to B at 280° C. is heat treatment immediately after molding at a temperature of 220° C. in an air-ventilated oven for a residence time of 30 minutes to give a residual monomer content of 116 ppm.

What is claimed is:

1. A process of producing a molded article from a composition comprising a syndiotactic vinyl aromatic polymer, comprising:

a) molding the composition comprising a syndiotactic vinyl aromatic polymer, wherein the syndiotactic vinyl aromatic polymer has a residual vinyl aromatic monomer content of less than 0.3 parts per 100 parts syndiotactic vinyl aromatic polymer, at a temperature of from 265° C. to 305° C. to produce a molded article;

b) heat treating the molded article at a temperature of 210° C to 230° C. for at least 2 minutes to thermally initiate free radical polymerization of the residual monomer such that the molded article has a residual vinyl aromatic monomer content of less than 0.05 parts per 100 parts syndiotactic vinyl aromatic polymer.

2. The process of claim 1 wherein the residual vinyl aromatic monomer content of the syndiotactic vinyl aromatic polymer is less than 500 ppm based on the total weight of the syndiotactic vinyl aromatic polymer.

3. The process of claim 1, wherein the syndiotactic vinyl aromatic polymer is syndiotactic polystyrene.

4. The process of claim 1, wherein the composition of the syndiotactic vinyl aromatic polymer additionally comprises glass filler.

5. The process of claim 1, wherein the composition comprises:

22 to 100 weight percent syndiotactic styrene homopolymer having less than 500 ppm residual monomer content, 0 to 1 weight percent heat stabilizer, 0 to 2 weight percent crystallization nucleator, 0 to 5 weight percent lubricant, 0 to 20 weight percent impact modifier, 0 to 45 weight percent glass filler, and 0 to 10 weight percent compatibilizer, wherein all weight percents are based on the total weight of the composition.

* * * * *